Dec. 27, 1932.

F. G. PLOWICK 1,892,248

BATTERY TAG HOLDER

Filed Aug. 16, 1932

Inventor
Frank G. Plowick

By Clarence A. O'Brien
Attorney

Patented Dec. 27, 1932

1,892,248

UNITED STATES PATENT OFFICE

FRANK G. PLOWICK, OF DETROIT, MICHIGAN

BATTERY TAG HOLDER

Application filed August 16, 1932. Serial No. 629,054.

This invention relates to a tag holder for a battery, the general object of the invention being to provide a holder having means thereon for supporting a battery tag and means whereby the holder can be easily and quickly attached to a battery and removed therefrom.

Another object of the invention is to so form the connecting means that the holder can be placed on batteries without handles as well as those with handles.

This invention also consists in certain other features of construction and in the combination and arrangement of the several parts to be hereinafter fully described, illustrated in the accompanying drawing and specifically pointed out in the appended claim.

In describing the invention in detail reference will be had to the accompanying drawing wherein like characters denote like or corresponding parts throughout the several views, and in which:—

Figure 2:
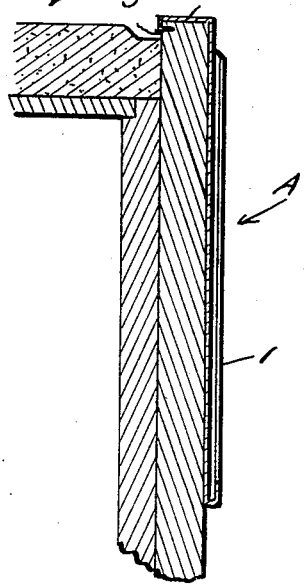
Fig. 2 is a section on line 2—2 of Fig. 1.
Figure 3:
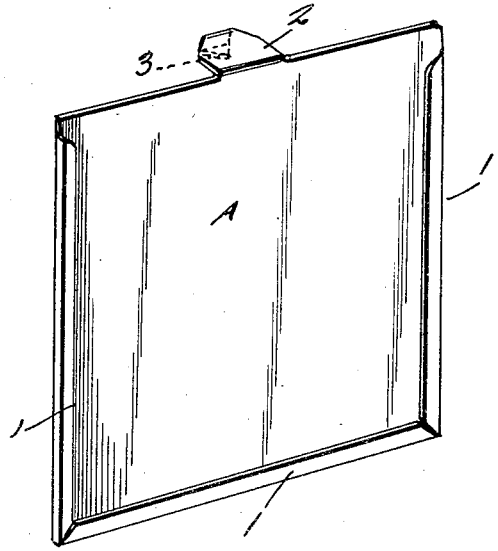
Fig. 3 is a perspective view of the holder.

As shown in these views, the holder A is formed of a single piece of metal having its side and bottom edges turned over to provide the flanges 1 which form guides for a battery tag C so that the tag can be easily removed or placed in the holder. A small extension is formed on the central part of the top edge of the device and is bent to a horizontal position to provide a tongue 2 and this tongue has its free end reduced and bent twice with its extremity pointed as at 3 so that the tongue can be placed over an upper edge of one side or end of a battery B and then the pointed end pressed into the part of the battery as shown in Fig. 2, so as to attach the holder to the battery.

Figure 1:
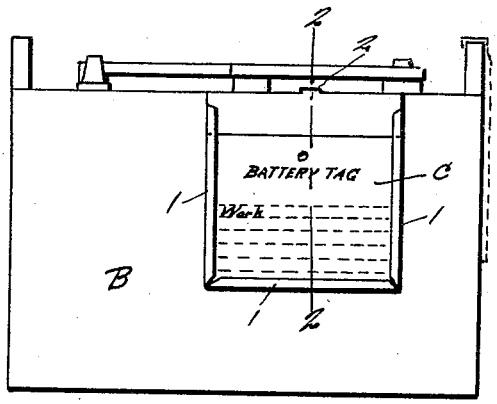
Figure 1 is a view of a battery showing a tag holder attached to one side thereof in full lines and this view also shows a tag holder connected to a handle part of the battery, in dotted lines.

If desired, the tongue can be attached to a handle of a battery as shown in dotted lines in Fig. 1. The holder is preferably formed of tin or the like coated with acid-proof paint so that the acid from the battery will not damage the holder.

Thus it will be seen that I have provided a tag holder for a battery which will protect the tag from coming into contact with acid from the battery and which avoids the use of tying or wiring the tag to the battery which cannot be done unless the battery is provided with a handle. This invention permits the tag to be attached to any part of the battery and whether or not the battery is provided with a handle.

It is thought from the foregoing description that the advantages and novel features of the invention will be readily apparent.

It is to be understood that changes may be made in the construction and in the combination and arrangement of the several parts provided that such changes may be made within the scope of the appended claim.

Having thus described my invention, what I claim as new is:—

A holder for a battery tag comprising a member of plate-like form having flanges at its sides and bottom for receiving the edges of a tag and means for detachably connecting the holder to a battery, said means consisting of a bent-over tongue connected to the upper edge of the plate-like member and having its extremity reduced and bent over to form a projection for penetrating a part of a battery.

In testimony whereof I affix my signature.

FRANK G. PLOWICK.